United States Patent
Niwa et al.

(10) Patent No.: US 6,508,591 B2
(45) Date of Patent: Jan. 21, 2003

(54) CONDUCTIVE CERAMIC BEARING BALL, BALL BEARING, MOTOR HAVING BEARING, HARD DISK DRIVE, AND POLYGON SCANNER

(75) Inventors: Tomonori Niwa, Aichi (JP); Tetsuji Yogo, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/942,990

(22) Filed: Aug. 31, 2001

(65) Prior Publication Data

US 2002/0044705 A1 Apr. 18, 2002

(30) Foreign Application Priority Data

Aug. 31, 2000 (JP) .......................................... 2000-263391

(51) Int. Cl.[7] .............................................. F16C 33/62
(52) U.S. Cl. ...................... 384/492; 384/907.1; 384/912
(58) Field of Search ................................. 384/492, 913, 384/625, 907.1, 907

(56) References Cited

U.S. PATENT DOCUMENTS 5,887,985 A * 3/1999 Loree et al. ................. 384/492
6,357,923 B1 * 3/2002 Sato et al. ................... 384/492
6,422,756 B1 * 7/2002 Tanaka et al. ............... 384/492

FOREIGN PATENT DOCUMENTS

| EP | 1134204 | * | 9/2001 | |
| JP | 54-47053 | * | 4/1979 | |
| JP | 11-153142 | | 8/1999 | ........... F16C/33/62 |

OTHER PUBLICATIONS

The Journal of American Chemical Society, vol. 57 (1935), pp. 1754–1755.

* cited by examiner

Primary Examiner—Christopher P. Schwartz
Assistant Examiner—Melanie Torres
(74) Attorney, Agent, or Firm—Sughrue Mion, PLLC

(57) ABSTRACT

A conductive ceramic bearing ball made of composite ceramic and having a mixed microstructure of a silicon nitride phase and a titanium nitride phase. The content ratio of the silicon nitride phase to the titanium nitride phase is such that the conductive ceramic bearing ball has an average coefficient of linear expansion within a temperature range of 20° C.–100° C. of from $2\times10^{-6}$/K to $5\times10^{-6}$/K.

15 Claims, 12 Drawing Sheets

CUMULATIVE RELATIVE FREQUENCY $nrc = \dfrac{N_c}{N_o} \times 100$ (%)

$N_o$: TOTAL FREQUENCY $N_c$: CUMULATIVE FREQUENCY

90% GRAIN SIZE: GRAIN SIZE CORRESPONDING TO nrc=90%

50% GRAIN SIZE: GRAIN SIZE CORRESPONDING TO nrc=50%

CONDUCTIVE CERAMIC BEARING BALL, BALL BEARING, MOTOR HAVING BEARING, HARD DISK DRIVE, AND POLYGON SCANNER

BACKGROUND OF THE INVENTION

1. Field of the Invention

The present invention relates to a conductive ceramic bearing ball, a method for manufacturing the conductive ceramic bearing ball, a ball bearing containing the conductive ceramic bearing ball, a motor having a bearing member including the ball bearing, a hard disk drive including the motor for rotating a hard disk, and a polygon scanner including the motor for rotating a polygon mirror.

2. Description of the Related Art

A bearing ball is generally made of metal, such as bearing steel. However, in order to impart enhanced wear resistance, the manufacture of bearing balls from ceramic is known. Examples of ceramic for use in manufacturing bearing balls include silicon nitride ceramic, alumina ceramic and zirconia ceramic.

3. Problems Solved by the Invention

Since the above-mentioned bearing balls are composed of an insulating material, during rotation as rolling elements in a bearing, the bearing balls tend to be electrified (charged) with static electricity generated by friction. When such charge becomes excessive, during manufacture of, for example, small-diameter bearing balls, the bearing balls may adhere to apparatus (e.g., a container), or dust may adhere to the bearing balls, thereby hindering smooth progress of working.

Since bearing balls of a bearing used in precision electronic equipment, such as a hard disk drive of a computer, rotate at high speed, electrostatically induced adhesion of foreign matter, such as dust, to the bearing balls or to an inner or outer ring is highly likely to cause undesirable noise and vibration.

In application to such precision electronic equipment, a conductive ceramic bearing ball has been proposed having a microstructure composed of insulating ceramic matrix and conductive ceramic dispersed in the matrix. However, when a conductive ceramic phase is contained in a large amount to enhance electrical conductivity, the bearing ball may suffer impaired strength or wear resistance. Also, a certain type of impurity contained in bearing ball material may cause defects, such as excess noise or vibration, in application to precision electronic equipment involving high-speed rotation, such as a hard disk drive of a computer or a polygon scanner.

Furthermore, when a bearing is rotated at high speed, the temperature of the bearing rises to approximately 60° C.–100° C. because of self-generated heat induced by sliding. In this case, if the coefficient of thermal expansion differs greatly between the ceramic constituting the bearing balls and the steel material constituting an inner or outer ring, the rotational precision of the bearing is impaired.

SUMMARY OF THE INVENTION

It is therefore an object of the present invention to provide a conductive ceramic bearing ball which resists charging, exhibits practically sufficient strength and wear resistance, and does not differ greatly in coefficient of thermal expansion from a ferrous material constituting an inner/outer ring, to thereby maintain rotational precision of a bearing which would otherwise degrade due to an increase in temperature induced by frictional heat generation. It is also an object of the present invention to provide a ball bearing using the conductive ceramic bearing ball, a motor having a bearing using the ball bearing, a hard disk drive using the motor, and a polygon scanner using the motor.

The above objects of the present invention are achieved by providing a conductive ceramic ball comprising a mixed microstructure of a silicon nitride phase and a titanium nitride phase and having a content ratio of said silicon nitride phase to said titanium nitride phase such that the conductive ceramic bearing ball has an average coefficient of linear expansion within a temperature range of 20° C.–100° C. of from $2 \times 10^{-6}$/K to $5 \times 10^{-6}$/K.

Also, a ball bearing of the present invention is characterized in that a plurality of conductive ceramic bearing balls are incorporated as rolling elements between an inner ring and an outer ring made of a ferrous metal containing a predominant amount of iron. The inner and outer rings (i.e., races) of the bearing can be made of a steel material having a Ni content of not greater than 3% by weight (including 0% by weight), such as high-carbon chromium bearing steel (for example, SUJ1, SUJ2, or SUJ3 as described in JIS G 4805 (1990)) or martensitic stainless steel (for example, SUS440).

DESCRIPTION OF REFERENCE NUMERALS

Figure 1:
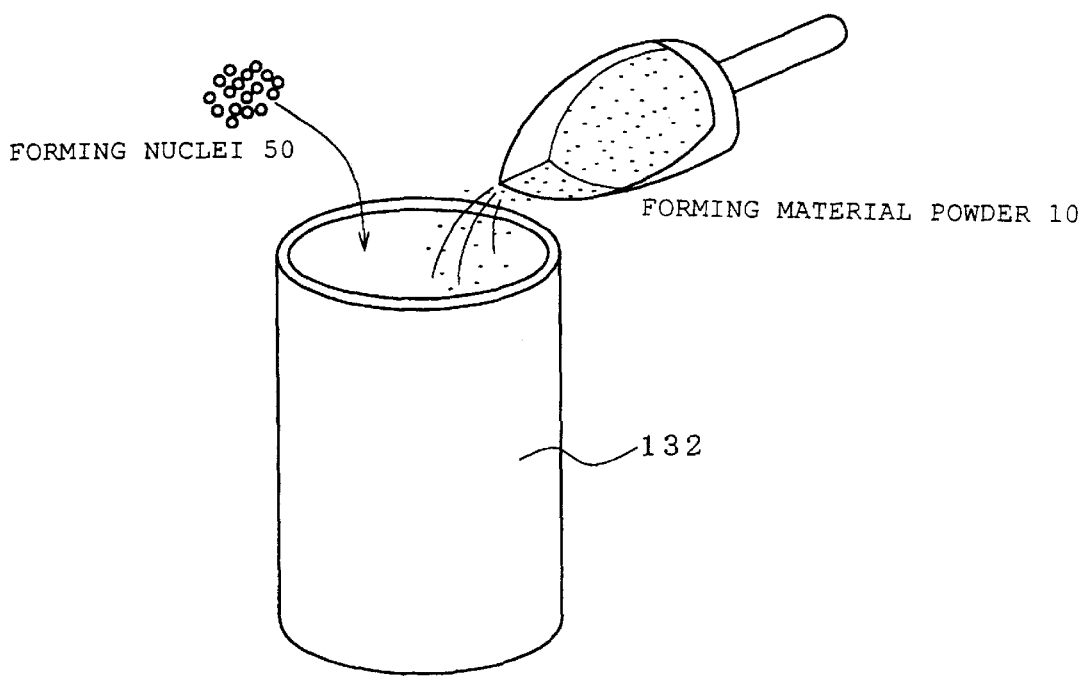
FIG. 1 is a view showing a step of rolling granulation.

40, 116, 118, 406, 407: ceramic ball bearings
43, 144, 413, 414: conductive ceramic bearing balls
122: motor
404: head arm 100: hard disk drive mechanism
300: polygon scanner

DETAILED DESCRIPTION OF THE INVENTION

Silicon nitride ceramic is light and exhibits excellent wear resistance as compared with other ceramic materials, as well as good balance between mechanical strength and toughness. Thus, silicon nitride ceramic is widely used as a material for structural components, such as sliding members, cutting tools and bearing balls. However, because of very high insulation, in application to a bearing ball, silicon nitride ceramic tends to involve the aforementioned electrification (charging) problem. Thus, the present invention provides a ball made of composite ceramic whose microstructure is such that the titanium nitride phase is dispersed within the silicon nitride matrix. The titanium nitride phase exhibits excellent electrical conductivity and is unlikely to impair the strength of the resultant ceramic when dispersed within a silicon nitride matrix. Titanium nitride itself is inferior to silicon nitride in strength and wear resistance. However, since titanium nitride exhibits relatively high lattice matching with the silicon nitride phase, even when titanium nitride is added to the silicon nitride matrix in a relatively large amount in order to enhance electrical conductivity, titanium nitride is unlikely, by virtue of dispersion reinforcement action, to impair strength and wear resistance of the resultant ceramic so long as titanium nitride is dispersed to a certain degree of uniformity.

When ceramic balls are used; for example, as bearing balls of a bearing used in a rotary drive unit of precision equipment, such as peripheral equipment of a computer, such as a hard disk drive, a CD-ROM drive, an MO drive, or a DVD drive, or a polygon scanner of a laser printer, the ceramic balls are subjected to high-speed rotation. This is because a bearing used in a rotary drive unit of such precision equipment must rotate at a high speed of, for example, not less than 8000 rpm (in some cases not less than 10000 rpm or not less than 30000 rpm). As a result of application to such high-speed rotation, the temperature of the bearing rises to approximately 60° C.–100° C. because of self-generated heat induced by sliding. In measurement over a bearing working temperature range of room temperature (20° C.) to 100° C., silicon nitride ceramic used conventionally as a material for a ceramic bearing ball exhibits an average coefficient of linear expansion of $1.4 \times 10^{-6}/°C.$, which differs greatly from the coefficient of linear expansion (substantially $8 \times 10^{-6}/°C.$) of a ferrous material of which an inner or outer ring of a bearing is made. Thus, as the bearing temperature rises, the clearance between bearing balls and the inner/outer ring increases, thereby impairing the rotational precision of the bearing.

The inventors of the present invention carried out extensive studies and found that silicon nitride ceramic containing titanium nitride exhibits a greater average coefficient of linear expansion within a temperature range of 20° C. to 100° C. than does silicon nitride ceramic. Particularly, these studies revealed that by adjusting the content ratio of the silicon nitride phase to the titanium nitride phase so as to attain an average coefficient of linear expansion of composite ceramic within a temperature range of 20° C. to 100° C. of from $2 \times 10^{-6}/K$ to $5 \times 10^{-6}/K$, while the strength and wear resistance of the composite ceramic are maintained favorably, the difference in coefficient of linear expansion between the composite ceramic and a ferrous material of which the inner/outer ring of a bearing is made can be reduced effectively. This prevents or suppresses impaired rotational precision of the bearing which would otherwise result with an increase in temperature. The present invention has been achieved on the basis of these findings.

A zirconia ceramic ball disclosed, for example, in Japanese Patent Application Laid-Open (kokai) No. 11-153142 is made of ceramic which does not differ greatly from a ferrous material in coefficient of linear expansion. However, in the event of fracture, the zirconia ceramic ball tends to fracture abruptly along a plane extending deeply across the ball. Such fracture during bearing operation leads directly to motor seizure. For example, in the case of a hard disk drive, a sudden halt of a motor during writing of data to a hard disk may cause a significant problem, such as a write failure or recording-sector damage. By contrast, when a bearing ball made of composite ceramic for use in the present invention fractures, flakes gradually come off the surface of the ball (so-called fisheye exfoliation); thus, an abrupt, fatal fracture of the ball is unlikely to occur. Thus, even when the bearing ball fractures, the fracture is unlikely to lead, for example, to abrupt motor seizure.

When the average coefficient of linear expansion of composite ceramic within a temperature range of 20° C. to 100° C. is less than $2 \times 10^{-6}/K$, the clearance between ceramic balls and the inner/outer ring of a bearing increases as the temperature of the beating rises, thereby impairing the rotational precision of the bearing. The coefficient of linear expansion of composite ceramic increases with titanium nitride content. However, even when the titanium nitride content of composite ceramic is increased considerably, a coefficient of linear expansion in excess of $5 \times 10^{-6}/K$ is hard to achieve. Even when such a high coefficient of linear expansion is realized, the silicon nitride phase content becomes too low, resulting in difficulty in attaining sufficient strength and wear resistance. The average coefficient of linear expansion of composite ceramic within a temperature range of 20° C. to 100° C. is preferably from $2.5 \times 10^{-6}/K$ to $5 \times 10^{-6}/K$. When a further increase in bearing temperature is to be considered, the average coefficient of linear expansion of composite ceramic within a temperature range of 20° C. to 200° C. is from $3 \times 10^{-6}/K$ to $6 \times 10^{-6}/K$, preferably from $3.5 \times 10^{-6}/K$ to $6 \times 10^{-6}/K$.

Herein, the titanium nitride phase is a phase that contains a predominant amount of titanium nitride. The silicon nitride phase is a phase that consists predominantly of silicon nitride containing β-silicon nitride in an amount of not less than 70% by volume (preferably not less than 90% by volume). In this case, silicon nitride may have a portion of Si or N atoms substituted by Al or oxygen atoms, and may further contain metallic atoms, such as Li, Ca, Mg, and Y, in the form of a solid solution. Examples of silicon nitride which has undergone such substitution include sialons represented by the following formulae.

β-sialon: $Si_{6-z}Al_zO_zN_{8-z}$ (z=0 to 4.2)

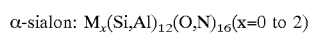

α-sialon: $M_x(Si,Al)_{12}(O,N)_{16}$ (x=0 to 2)

M: Li, Mg, Ca, Y, R (R represents rare-earth elements excluding La and Ce).

In the present invention, composite ceramic can contain as an oxide-type sintering aid component at least one element selected from the group consisting of Mg and elements belonging to Groups 3A, 4A, 5A, 3B (e.g., Al (in the form of, for example, alumina)) and 4B (e.g., Si (in the form of, for example, silica)) of the Periodic Table. These elements are present in a sintered body in the form of oxides. Examples of elements found in commonly used sintering aid components and belonging to Group 3A include Sc, Y, La, Ce, Pr, Nd, Sm, Eu, Gd, Tb, Dy, Ho, Er, Tm, Yb and Lu. The content of each of these elements R is expressed on an oxide basis; specifically, on the basis of RO2 for Ce and on the basis of R2O3 for the remaining elements. Particularly, oxides of heavy-rare-earth elements Y, Ce, Tb, Dy, Ho, Er, Tm and Yb are used advantageously, since they improve strength, toughness and wear resistance of a sintered body. Also, magnesia spinel and zirconia can be used as sintering aids.

Herein, unless otherwise specified, the term "predominant" used in relation to content means that a substance in question is contained in an amount of not less than 50% by weight (the terms "predominantly" and "mainly" have the same meaning).

The microstructure of the above-described composite ceramic is such that the silicon nitride phase and the titanium nitride phase are bonded by means of, for example, a glassy and/or crystalline bond phase derived from a sintering aid component. Notably, the sintering aid component mainly constitutes the bonding phase, but a portion of the sintering aid component may be incorporated into the matrix phase. The bonding phase may contain, in addition to intentionally added components serving as sintering aids, unavoidable impurities; for example, silicon oxide contained in a material silicon nitride powder.

Preferably, the composite ceramic constituting the ceramic bearing ball of the present invention contains a titanium nitride phase in an amount of 30–90% by mass. When the titanium nitride phase content is less than 30% by mass, the composite ceramic fails to attain a coefficient of linear expansion of not less than $2\times10^{-6}$/K described previously. When the titanium nitride phase content is in excess of 90% by mass, the silicon nitride phase content becomes too low, resulting in difficulty in attaining sufficient strength and wear resistance. More preferably, the titanium nitride phase content is 35–70% by mass.

Composite ceramic for use in the present invention has a microstructure such that the portion other than the titanium nitride phase is mainly formed of the silicon nitride phase and the grain boundary phase. From a similar point of view, the silicon nitride phase and the grain boundary phase are contained in a total amount of 30–90% by mass (i.e., by weight), preferably 35–70% by mass. In this case, the grain boundary phase content is preferably 3–10% by mass (accordingly, the silicon nitride phase content is preferably 20–87% by mass, more preferably 25–67% by mass). When the grain boundary phase content is less than 3% by weight (or by mass), the sintered body is unlikely to become dense. When the grain boundary phase content is in excess of 10% by weight (or by mass), the thus obtained ball has impaired strength, toughness, heat resistance, or wear resistance. More preferably, the grain boundary phase content is 3–8% by weight (or by mass).

In composite ceramic constituting the conductive ceramic bearing ball of the present invention, as described above, the titanium nitride phase functions as an electrically conductive phase, thereby imparting appropriate electrical conductivity to the composite ceramic and thus effectively preventing or suppressing electrification (charging) of the ceramic beating ball. The preventing or suppressing effect is enhanced by imparting a surface electrical-resistivity of not greater than $10^6$ Ω·cm to the bearing ball. Herein, electrical resistivity is measured by a 4-probe method; specifically, four probes are contacted with the surface of a ceramic ball in order to measure electrical resistivity.

Next, a preferred method for manufacturing a conductive ceramic bearing ball of the present invention will be described. The conductive ceramic bearing ball of the present invention can be manufactured by the steps of: forming a spherical green body from a material powder containing a titanium nitride powder and a silicon nitride powder; sintering the spherical green body to obtain a spherical sintered body; and polishing the surface of the spherical sintered body. Preferably, the titanium nitride powder has a 50% grain size of not greater than 3.0 μm as measured using a laser diffraction granulometer. In the case of a 50% grain size greater than 3.0 μm, when a crystal grain in the titanium nitride phase appearing on the polished surface of a bearing ball as a result of polishing comes off, a considerably large pore is formed on the surface. Such a bearing ball tends to generate noise or vibration when used in a bearing. In contrast, attaining an unnecessarily small grain size involves considerably long pulverization time, resulting in increased cost in preparing a material powder. Therefore, the grain size is adjusted within a range that avoids these problems. More preferably, the 50% grain size of the titanium nitride powder is adjusted within a range of 0.9–1.5 μm.

Preferably, the oxygen content of the titanium nitride powder is not greater than 3% by mass. When the oxygen content is in excess of 3% by mass, titanium oxide, whose electrical conductivity is poor, is generated in a large amount; therefore, the thus obtained bearing ball may fail to exhibit sufficient electrical conductivity. Also, when titanium nitride particles are covered with titanium oxide, dispersion of titanium nitride during sintering is hindered; therefore, sintering is not sufficiently performed. Thus, a dense ceramic ball may fail to be obtained. More preferably, the oxygen content of the titanium nitride powder is not greater than 2% by mass. Particularly preferably, the oxygen content is reduced to the lowest possible level, so long as the problem of increased cost does not arise.

Next, it is preferable that the iron content of the titanium nitride powder is not greater than 0.3% by mass. An iron component contained in the titanium nitride powder is mostly an iron contaminant which is generated by wear of components of a pulverizer and mixed into the titanium nitride powder during manufacture of the titanium nitride powder. When the iron content of the titanium nitride powder is in excess of 0.3%, the Fe inclusion content derived from the iron contaminant in the thus obtained ceramic ball increases the following risk. The Fe inclusion exposed on the polished surface of a ceramic ball tends to generate noise or vibration when the ceramic ball is used in a bearing. More preferably, the iron content of the titanium nitride powder is not greater than 0.1%. Particularly preferably, the iron content is reduced to the lowest possible level, so long as the problem of increased cost does not arise.

Preferably, a material silicon nitride powder (raw material) has a 50% grain size of not greater than 0.8 μm as measured using a laser diffraction granulometer, and a BET specific surface area of 10–13 m²/g. Attaining a BET specific surface area of 10–13 m²/g suppresses local coarsening of silicon nitride crystal grains in the thus obtained ceramic ball and enhances dispersion of titanium nitride crystal grains, thereby improving strength and wear resistance and suppressing generation of noise or vibration when the ceramic ball is used in a bearing. When the BET specific surface area is less than 10 m²/g, the amount of coarse silicon nitride powder particles contained in a material powder increases. As a result, the thus obtained ceramic ball tends to have coarse silicon nitride crystal grains formed locally in a large amount. Thus, when a coarse silicon nitride crystal grain comes off from the polished surface of the ceramic ball, a large pore tends to be formed on the surface, thereby potentially generating noise or vibration when the ceramic ball is used in a bearing. Manufacture of a silicon nitride powder having a BET specific surface area in excess of 13 m$^2$/g involves increased cost attributable to considerably long pulverization time, and difficulty in handling of the powder during manufacture attributable to worsened fluidity.

Attaining a 50% grain size of a material silicon nitride powder of not greater than 0.8 μm enhances the strength of the thus obtained bearing ball and generally reduces the size of a crystal grain which may come off from the polished surface of the bearing ball. Thus, the precision of the polished surface as represented by sphericity and ball diameter variation can be readily maintained at a high level. On the other hand, attaining an unnecessarily small grain size for a material silicon nitride powder involves a considerably long pulverization time, resulting in increased preparation cost. Therefore, the grain size is adjusted within a range that avoids these problems. More preferably, the grain size of the silicon nitride powder is adjusted within a range of 0.3–0.6 μm.

Preferably, the cc percentage of the material silicon nitride powder (the percentage of cc-silicon nitride to entire silicon nitride) is not less than 70%. To the material silicon nitride powder, at least one element selected from the group consisting of rare-earth elements and elements belonging to Groups 3A, 4A, 5A, 3B and 4B is added as a sintering aid in an amount of 1–10% by weight, preferably 2–8% by weight, on an oxide basis. Notably, in preparation of the material, these elements may be added in the form of not only oxide but also a compound which is converted to oxide in the course of sintering, such as carbonate (e.g., magnesium carbonate) or hydroxide.

Figure 9:
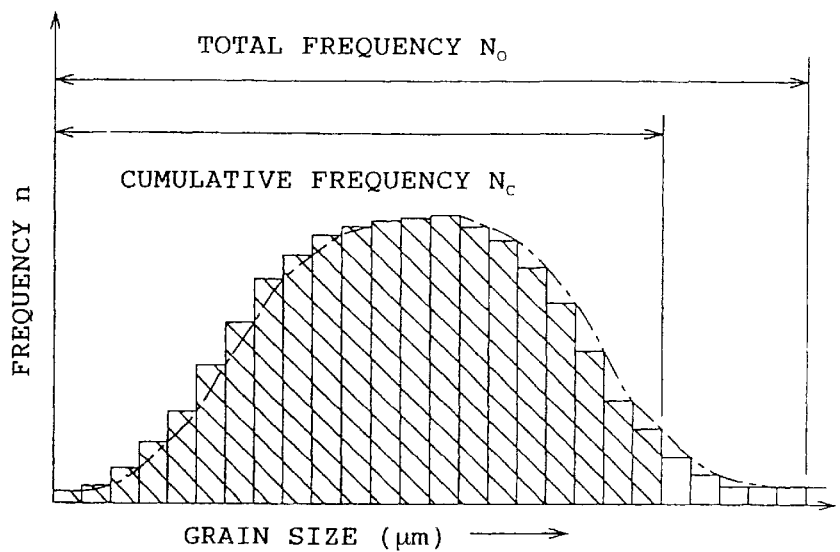
FIGS. 9(a) and 9(b) are views showing the concept of cumulative frequency and cumulative relative frequency as a function of grain size.
Figure 9:
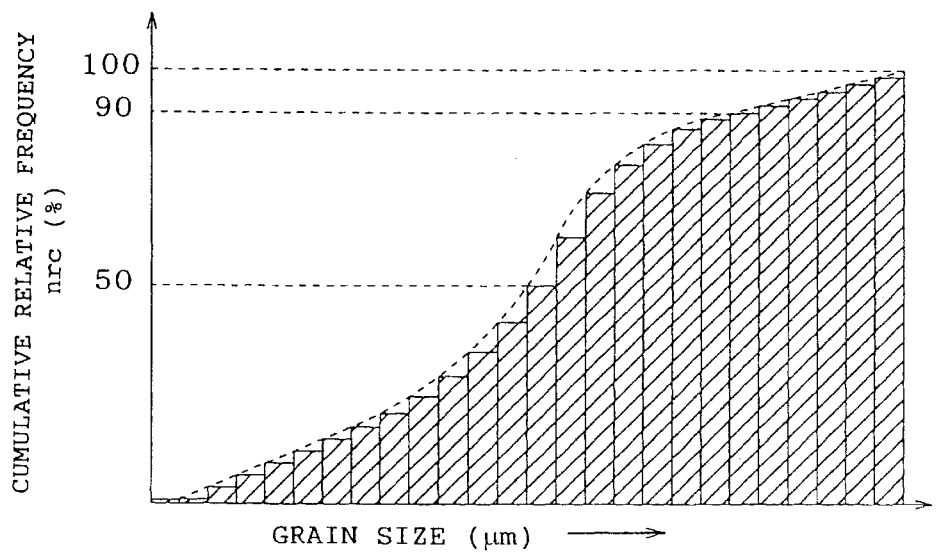

As shown in FIG. 9, frequencies of grain sizes of particles to be evaluated are distributed in ascending order of grain size. In the cumulative frequency distribution of FIG. 9(*a*), N$_c$ represents the cumulative frequency of grain sizes up to the grain size in question, and No represents the total frequency of grain sizes of particles to be evaluated. In FIG. 9(*b*), the relative frequency nrc is defined as "(N$_c$/N$_0$)×100 (%)." The X% grain size refers to a grain size corresponding to nrc=X (%) in the distribution of FIG. 9(*b*). For example, the 50% grain size is a grain size corresponding to nrc=50 (%).

Figure 8:
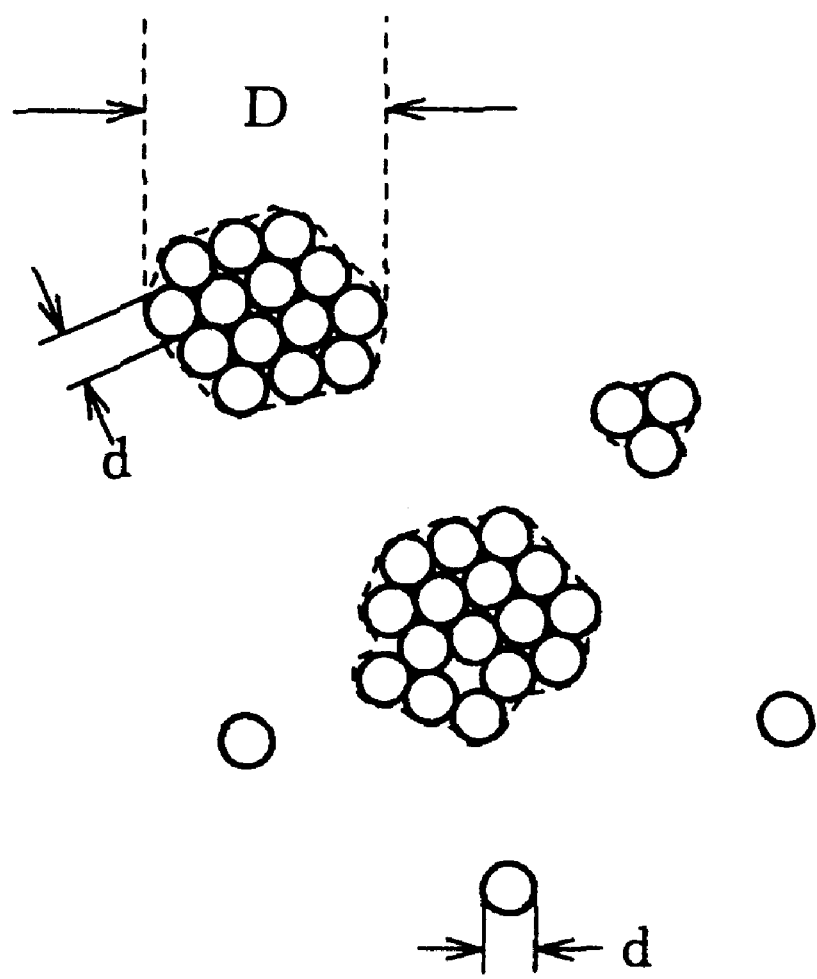
FIG. 8 is a view showing the diameter of a primary particle and the diameter of a secondary particle.

The measuring principle of a laser diffraction granulometer is well known. Briefly, sample powder is irradiated with a laser beam. A beam diffracted by powder particles is detected by means of a photodetector. The scattering angle and the intensity of the diffracted beam are obtained from the data detected by the photodetector. The grain size of the sample powder can be obtained from the scattering angle and the intensity. A ceramic material powder often contains secondary particles shown schematically in FIG. 8. Various factors, such as the action of an added organic binder and an electrostatic force, cause a plurality of primary particles to aggregate into a secondary particle. In measurement with a laser diffraction granulometer, an aggregate particle and a solitary primary particle do not exhibit much difference in the behavior of diffraction of an incident laser beam. Accordingly, whether a measured grain size is of a solitary primary particle or of an aggregate secondary particle is not definitely known. That is, the thus-measured grain size reflects the diameter of a secondary particle D shown in FIG. 8 (in this case, a solitary primary particle is also considered to be a secondary particle as defined in a broad sense). An average grain size or 50% grain size calculated from the measured grain size reflects an average grain size or 50% grain size with respect to secondary particles. Notably, in preparation of a forming material powder for use in rolling granulation, which will be described below, the grain size of powder represents that as measured before preparation of the forming material powder.

The specific surface area of the forming material powder is measured by the adsorption method. Specifically, the specific surface area can be obtained from the amount of gas adsorbed on the surface of powder particles. According to general practice, an adsorption curve indicative of the relationship between the pressure of gas to be measured and the amount of adsorption is measured. The known BET (an acronym representing originators, Brunauer, Emett and Teller) formula relating to polymolecular adsorption is applied to the adsorption curve so as to obtain the amount of adsorption vm upon completion of a monomolecular layer. A BET specific surface area calculated from the obtained amount of adsorption vm is used as the specific surface area of the powder. However, when approximation does not make much difference, the amount of adsorption vm of the monomolecular layer may be read directly from the adsorption curve. For example, when the adsorption curve contains a section in which the pressure of gas is substantially proportional to the amount of adsorption, the amount of adsorption corresponding to the low-pressure end point of the section may be read as the vm value (refer to the monograph by Brunauer and Emett appearing in The Journal of American Chemical Society, Vol. 57 (1935), page 1754). Since molecules of adsorbed gas penetrate into a secondary particle to thereby cover individual constituent primary particles of the secondary particle, the specific surface area obtained by the adsorption method reflects the specific surface area of a primary particle and thus reflects the average value of the diameter of a primary particle d shown in FIG. 8. Notably, as a matter of course, the value of specific surface area measured by the adsorption method does not vary much before and after preparation of the forming material powder for use in rolling granulation, which is described below.

The ball bearing of the present invention can be effectively used; for example, as bearing balls of a bearing used in a rotary drive unit of precision equipment, such as peripheral equipment of a computer, namely, a hard disk drive, a CD-ROM drive, an MO drive, or a DVD drive, or a polygon scanner of a laser printer. A bearing used in a rotary drive unit of such precision equipment must rotate at a high speed of, for example, not less 8000 rpm (in some cases not less than 10000 rpm or not less than 30000 rpm). Even in applications to such high-speed rotation, the ball bearing of the present invention effectively suppresses the generation of noise and vibration and exhibits excellent wear resistance. This is because exfoliation of the bearing ball surface is unlikely to take place. Also, since electrification (charging) of bearing balls can be effectively prevented or suppressed, manufacture of, for example, small-diameter balls does not hinder smooth progress of working which would otherwise result from electrostatically induced adhesion of balls to apparatus (e.g., a container). Additionally, the generation of noise and vibration attributable to electrostatically induced adhesion of foreign matter to bearing balls can be effectively prevented or suppressed.

Preferably, in order to suppress the generation of noise and vibration in application to such high-speed rotation, the bearing balls have a sphericity of not greater than 0.08 μm and a ball diameter variation of not greater than 0.10 μm. Attaining such sphericity and ball diameter variation enables the bearing balls to maintain long life even in application to high-speed rotation.

In a certain application of a bearing, improved electrical conductivity of a bearing ball yields the following effect, which differs from the above-described electrification-related effect. For example, a measuring apparatus for a semiconductor wafer; specifically, an apparatus for measuring flatness of a semiconductor wafer, measures the flatness in the following manner. While a rotary measuring table on which a wafer is placed is rotated, electricity is applied between the wafer and the rotary measuring table to thereby measure capacitance. On the basis of the measured capacitance, the flatness of the wafer is evaluated. In this case, electricity is usually applied to the rotary measuring table via a bearing and a rotary shaft of the rotary measuring table. Accordingly, in order to establish an electrically conductive path between the inner and outer rings of the bearing, bearing balls are conventionally made of metal, such as bearing steel. However, metallic bearing balls are inferior in wear resistance to ceramic and thus involve drawbacks, such as the generation of dust and shortened life. If bearing balls are made of ordinary insulating ceramic, an electrically conductive path cannot be established.

According to the present invention, material ceramic for bearing balls is partially composed of the titanium nitride phase to thereby attain electrical conductivity. Such ceramic exhibits higher wear resistance than does metal and establishes an electrically conductive path for the above-described measuring apparatus. When electrical measurement is to be conducted via such bearing balls, preferably, a relatively low electrical resistivity of, for example, $10^5$ Ω·cm is imparted to material ceramic for the bearing balls.

DESCRIPTION OF THE PREFERRED EMBODIMENTS

Embodiments of the present invention will next be described with reference to the drawings. However, the present invention should not be construed as being limited thereto.

Figure 4:
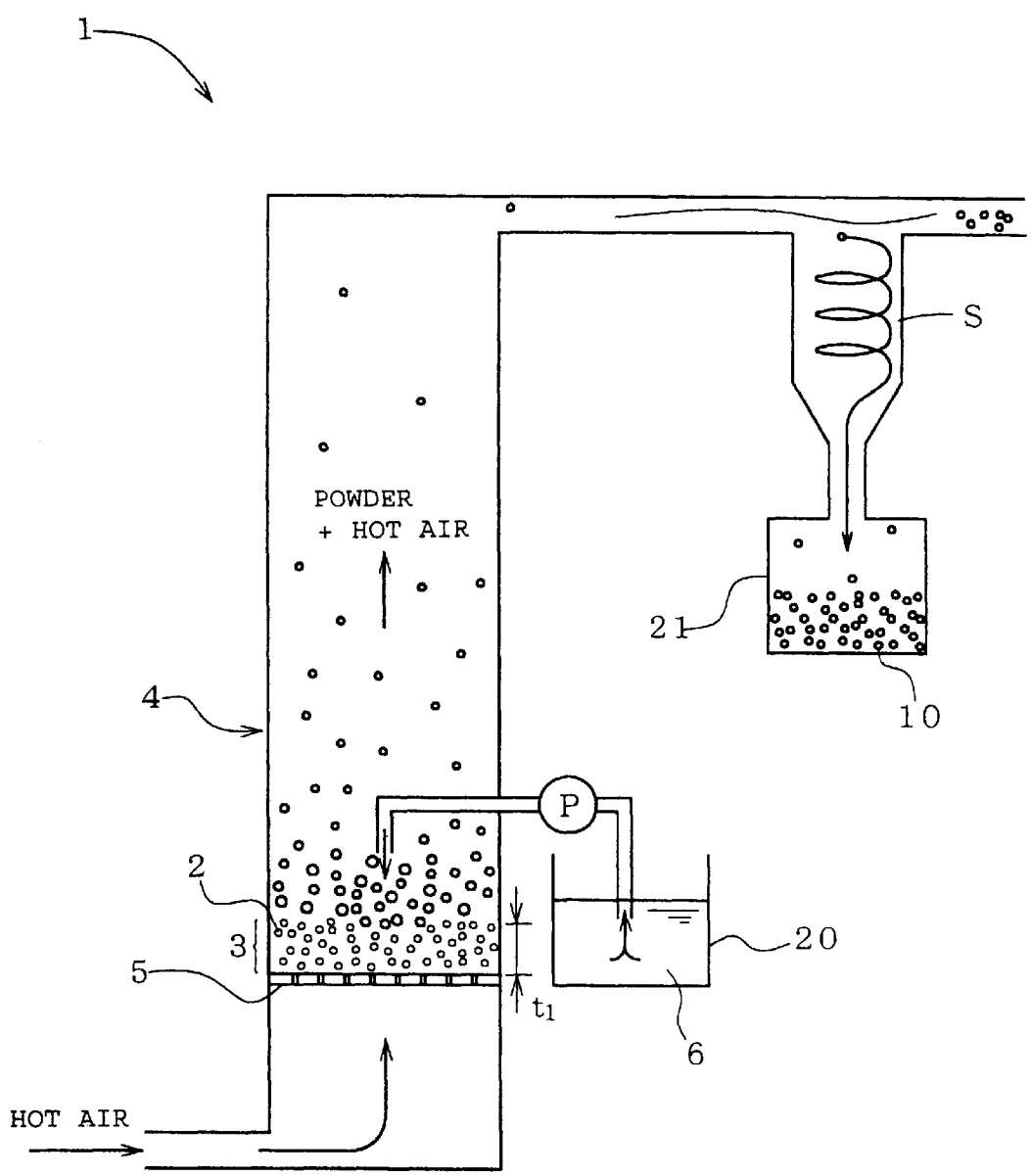
FIG. 4 is a conceptual longitudinal sectional view showing an example of an apparatus for manufacturing a forming (starting) material powder.

FIG. 4 shows an embodiment of an apparatus used in a process for preparing a forming material powder. In the apparatus, a hot air passage 1 includes a vertically disposed hot air duct 4. The hot air duct 4 includes a drying-media holder 5, which is located at an intermediate position of the hot air duct 4 and which includes a gas pass body, such as mesh or a plate having through-holes formed therein, adapted to permit passage of hot air and adapted not to permit passage of drying media 2. The drying media 2 are each composed of a ceramic ball, which is formed predominantly of alumina, zirconia, or a mixture thereof. The drying media 2 aggregate on the drying-media holder 5 to form a layer of drying-media aggregate 3.

The material powder is prepared in the form of a slurry, which, in turn, is prepared by the steps of: mixing a silicon nitride powder, a titanium nitride powder, and a sintering aid powder; adding an aqueous solvent to the resulting powder mixture; and wet-mixing (or wet-mixing and pulverizing) the resultant mixture using a ball mill or an attriter. The titanium nitride powder has, for example, an oxygen content of not greater than 3.0% by mass, an iron content of not greater than 0.3% by mass, and a 50% grain size of not greater than 3.0 μm as measured using a laser diffraction granulometer. The silicon nitride powder has a 50% grain size of, for example, not greater than 0.8 μm as measured using a laser diffraction granulometer and a BET specific area of, for example, 10–13 m²/g. The powders are mixed according to, for example, the following composition: 10–70% by mass titanium nitride powder (which will become the titanium nitride phase upon firing); 20–87% by mass silicon nitride powder (which will become the silicon nitride phase upon firing); and 3–10% by mass oxide-type sintering aid powder (which will become the grain boundary phase upon firing).

Figure 6:
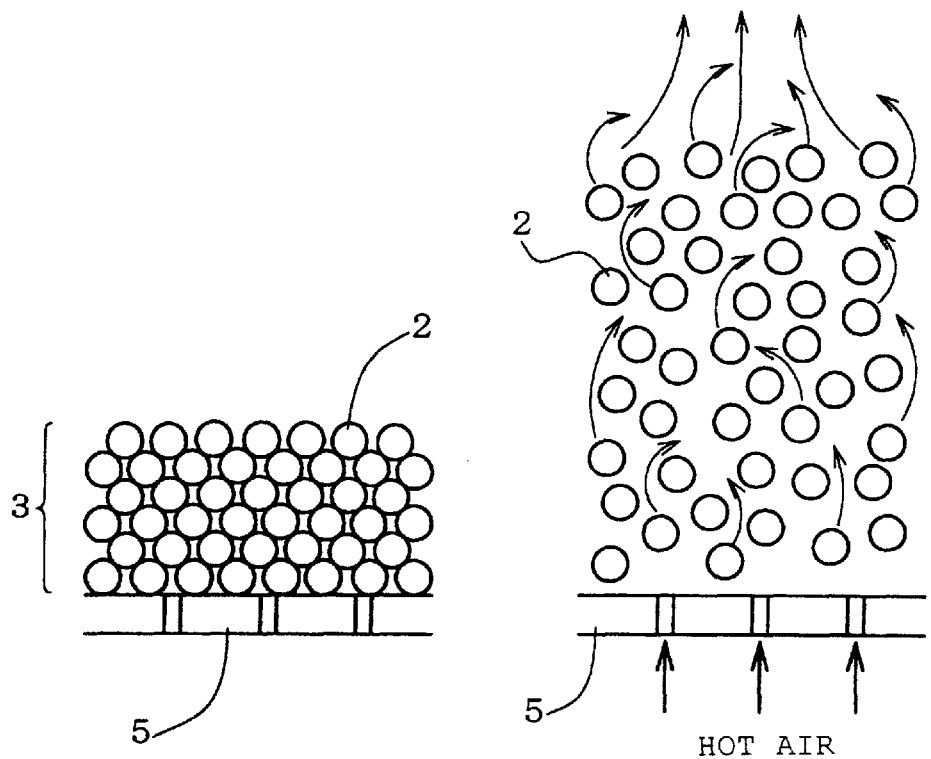
FIG. 6 are views showing the action of the apparatus of FIG. 4.
Figure 7:
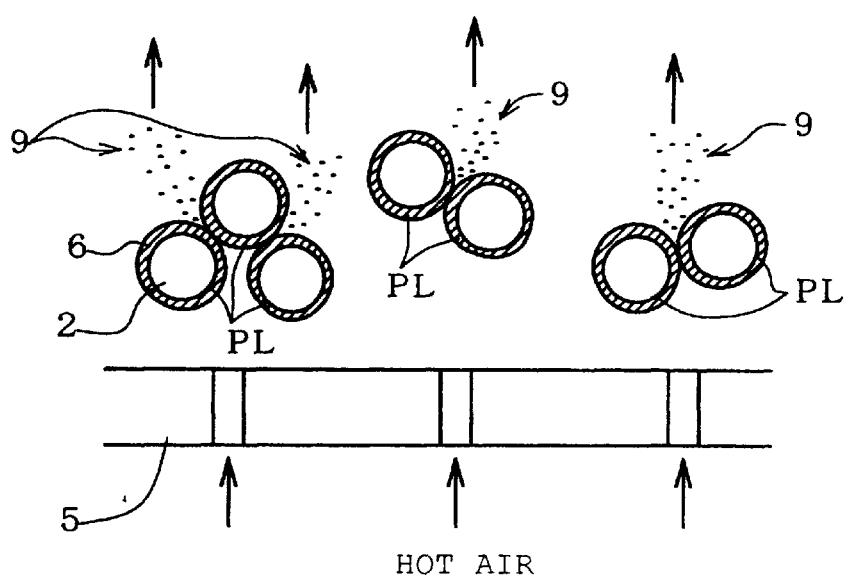
FIG. 7 is a view showing an action subsequent to that of FIG. 6.

As shown in FIG. 6, hot air flows through the drying-media aggregate 3 from underneath the drying-media holder 5 and upward through the hot air duct 4 while agitating the drying media 2. As shown in FIG. 4, a pump P pumps up a slurry 6 from a slurry tank 20. The slurry 6 is fed to the drying-media aggregate 3 from above and by gravity. As shown in FIG. 7, the slurry 6 adheres to the surfaces of the drying media 2 while being dried by hot air, thereby forming a powder aggregate layer PL on the surface of each drying medium 2.

The flow of hot air causes repeated agitation and falling of the drying media 2. Thus, the individual pieces of drying media 2 collide and rub against one another, whereby the powder aggregate layers PL are pulverized into forming material powder particles 9. Some of the forming material powder particles 9 assume the form of a solitary primary particle, but most of the forming material powder particles 9 assume the form of a secondary particle, which is the aggregation of primary particles. The forming material powder particles 9 having a grain size not greater than a certain value are conveyed downstream by hot air (FIG. 4). The forming material powder particles 9 having a grain size greater than a certain value are not blown by hot air, but again fall onto the drying-media aggregate 3, thereby undergoing further pulverization effected by the drying media 2. The forming material powder particles 9 conveyed downstream by hot air pass through a cyclone S and are then collected as a forming material powder 10 in a collector 21.

In FIG. 4, the diameter of the drying medium 2 is determined as appropriate according to the cross-sectional area of the hot air duct 4. If the diameter of the drying medium 2 is insufficient, a sufficiently large impact force will not be exerted on the powder aggregate layers PL formed on the drying media 2. As a result, the forming material powder 10 may fail to attain a grain size falling within a predetermined range. If the diameter of the drying medium 2 is excessively large, the flow of hot air will encounter difficulty in agitating the drying media 2, again causing poor impact force. As a result, the forming material powder 10 may fail to attain a grain size falling within a predetermined range. Preferably, the drying media 2 are substantially uniform in diameter so as to leave an appropriate space therebetween, whereby the motion of the drying media 2 is accelerated during the flow of hot air.

A thickness t1 of the drying media 2 of the drying-media aggregate 3 is determined such that the drying media 2 move appropriately according to the velocity of hot air. If the thickness t1 is excessively large, the drying media 2 will encounter difficulty in moving, causing poor impact force. As a result, the forming material powder 10 may fail to attain a grain size falling within a predetermined range. If the thickness t1; i.e., the amount of the drying media 2, is excessively small, the drying media 2 will collide less frequently, resulting in impaired processing efficiency.

The temperature of hot air is determined such that the slurry 6 is dried sufficiently and the forming material powder 10 does not suffer any problem, such as thermal deterioration. For example, when a solvent used for preparation of the slurry 6 is composed predominantly of water, hot air having a temperature lower than 100° C. fails to sufficiently dry the fed slurry 6. The resultant forming material powder 10 has an excessively high water content and thus tends to agglomerate. As a result, the forming material powder 10 may fail to attain a predetermined grain size.

The velocity of hot air is determined so as not to cause the drying-media aggregate 3 to fly into the collector 21. If the velocity is excessively low, the drying media 2 will encounter difficulty in moving, resulting in poor impact force. As a result, the forming material powder 10 may fail to attain a grain size falling within a predetermined range. If the velocity is excessively high, the drying media 2 will fly too high, causing reduced frequency of collision. As a result, processing efficiency will decrease.

Figure 2:
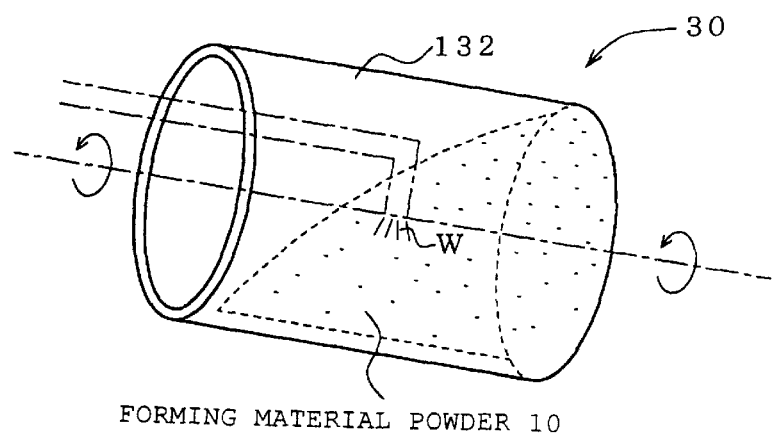
FIG. 2 is a view showing a step of rolling granulation subsequent to the step of FIG. 1.
Figure 3:
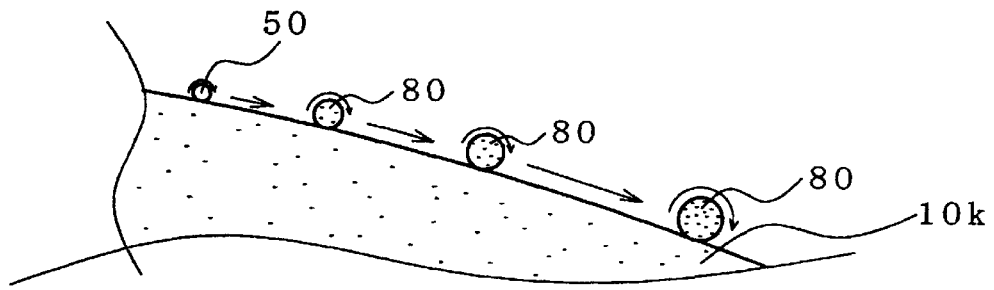
FIGS. 3(a)–3(e) are views showing a rolling granulation process, depicting the progress of rolling granulation.
Figure 3:
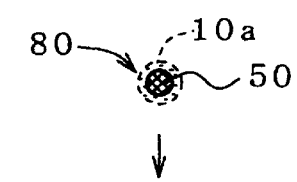
Figure 3:
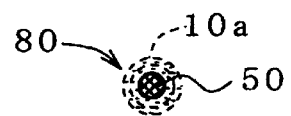
Figure 3:
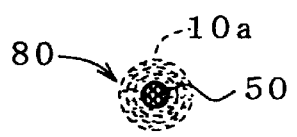
Figure 3:
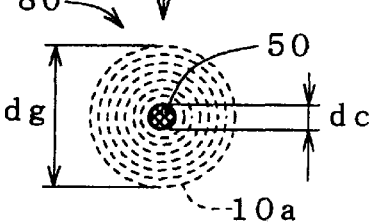
Figure 3:
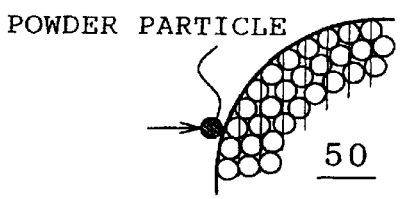
Figure 3:
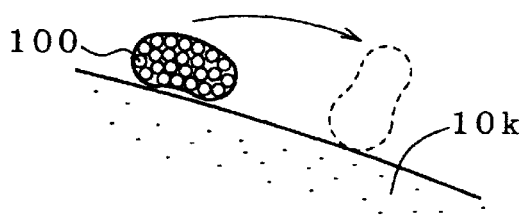
Figure 3:
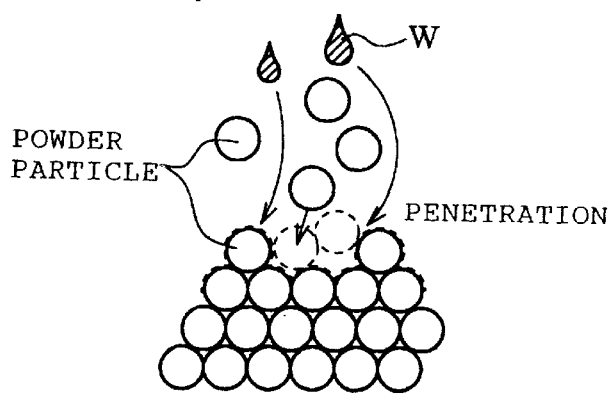

The thus-obtained forming material powder can be formed into spherical bodies by means of the rolling granulation process. Specifically, as shown in FIG. 1, the forming material powder 10 and relatively large nuclei 50 are placed in a granulation container 132. As shown in FIG. 2, the granulation container 132 is rotated at a constant peripheral speed. Water W is fed to the forming material powder 10 contained in the granulation container 132, by, for example, spraying. As shown in FIG. 3(a), a nucleus 50 in the forming material powder 10 rolls down an inclined powder layer 10k formed in the rotating granulation container 132 thereby spherically aggregating the powder 10 into a green body 80. The operating conditions of a rolling granulation apparatus 30 are adjusted such that the thus obtained green body 80 assumes a relative density of not lower than 61%. Specifically, the rotational speed of the granulation container 132 is adjusted to 10–200 rpm. The water feed rate is adjusted such that the spherical green body 80 assumes a water content of 10–20% by weight.

In order to accelerate the growth of the green body 80 during rolling granulation, as shown in FIG. 1, preferably, the forming nuclei 50 (which can be formed by pressing a ceramic powder or by injection molding a ceramic powder together with a resin binder) are placed in the granulation container 132. While the forming nucleus 50 is rolling down the forming material powder layer 10k as shown in FIG. 3(a), the forming material powder 10 adheres to and aggregates on the forming nucleus 50 spherically, as shown in FIG. 3(b), to thereby form the spherical green body 80 (rolling granulation process). The green body 80 is sintered to thereby become an unfinished ceramic ball. Alternatively, the forming material powder 10 is singly placed in the granulation container 132, and the granulation container 132 is rotated at a speed lower than that for growing the green body 80 (see FIG. 2), so as to form powder aggregates. When powder aggregates of sufficiently large size are generated in a sufficient amount, the rotational speed of the aggregation container 132 is increased to thereby grow the green bodies 80 while utilizing the aggregates as the nuclei 50. In this case, there is no need to place the nuclei 50 manufactured in a separate process, in the granulation container 132 together with the forming material powder 10.

The forming nucleus 50 does not collapse and can stably maintain its shape even when some external force is imposed thereon. Thus, when the nucleus 50 rolls down the forming material powder layer 10k as shown in FIG. 3(a), the nucleus 50 can reliably sustain reaction induced from its own weight. Conceivably, powder particles which are caught on the rolling nucleus 50 as shown in FIG. 3(c) are bonded by water W and array compressively upon each other as shown in FIG. 3(e) forming a highly dense aggregate layer 10a around the nucleus 50 as shown in FIG. 3(b). In this way, a granulated spherical green body 80 having a larger diameter (dg) than the nucleus diameter (dc) is attained. Notably, rolling granulation can be conducted without the use of nuclei. In this case, as shown in FIG. 3(d), an aggregate 100 corresponding to a nucleus is rather loose and soft at an initial stage of formation. Thus, in order to avoid the development of defects, the rotational speed of the container is preferably slightly lowered.

The thus-obtained green body 80 is subjected to firing to thereby obtain a composite-ceramic unfinished ball (hereinafter also called an unfinished ball) whose microstructure is such that the silicon nitride phase, the titanium nitride phase, and the grain boundary phase are mutually dispersed. The green body 80 undergoes either gas-pressure firing or atmospheric firing. Gas-pressure firing is performed in an atmosphere containing at least nitrogen and having a pressure greater than 1 atm. and not greater than 200 atm. Atmospheric firing is performed in an atmosphere having a pressure not greater than 1 atm. and containing at least nitrogen. The firing temperature is preferably set to 1500° C.–1800° C. When the firing temperature is lower than 1500° C., a defect, such as a pore, cannot be eliminated with a resultant impairment in strength. When the firing temperature is higher than 1800° C., grain growth impairs the strength of a sintered body. Notably, firing can be performed in two stages; i.e., primary firing and secondary firing. For example, primary firing is performed at a temperature not higher than 1800° C. in a nonoxidizing atmosphere containing nitrogen and at atmospheric pressure or at a pressure of not higher than 10 atm. such that a sintered body obtained through primary firing has a relative density of not less than 78%, preferably not less than 90%. When a sintered body obtained by primary firing has a relative density of less than 78%, the sintered body which has undergone secondary firing tends to suffer occurrence of a number of remaining defects, such as remaining pores. Secondary firing can be performed at a temperature of 1500–1800° C. in a nonoxidizing atmosphere containing nitrogen and at atmospheric pressure or at a pressure of not higher than 200 atm. When the pressure of secondary firing is in excess of 200 atm., the surface hardness of the thus obtained sintered unfinished ball increases to such an extent as to cause difficulty in machining, such as polishing. As a result, a product ball may fail to attain required dimensional accuracy.

By virtue of enhancement of the relative density of a green body to 61% or higher by means of the aforementioned rolling granulation process, an unfinished ball obtained by firing becomes highly dense. Thus, defects, such as pores, become unlikely to remain in a surface layer portion of the unfinished ball. The unfinished ball undergoes rough polishing for dimensional adjustment and then undergoes fine polishing, which is performed using stationary abrasive grains. The conductive ceramic bearing ball of the present invention is thus obtained. The conductive ceramic bearing ball can attain a sphericity of not greater than 0.08 $\mu$m. Furthermore, ball diameter variation among the conductive ceramic bearing balls can be not greater than 0.10 $\mu$m. The sphericity and the ball diameter variation are measured based on Japanese Industrial Standard (JIS B1501-1988).

Figure 10:
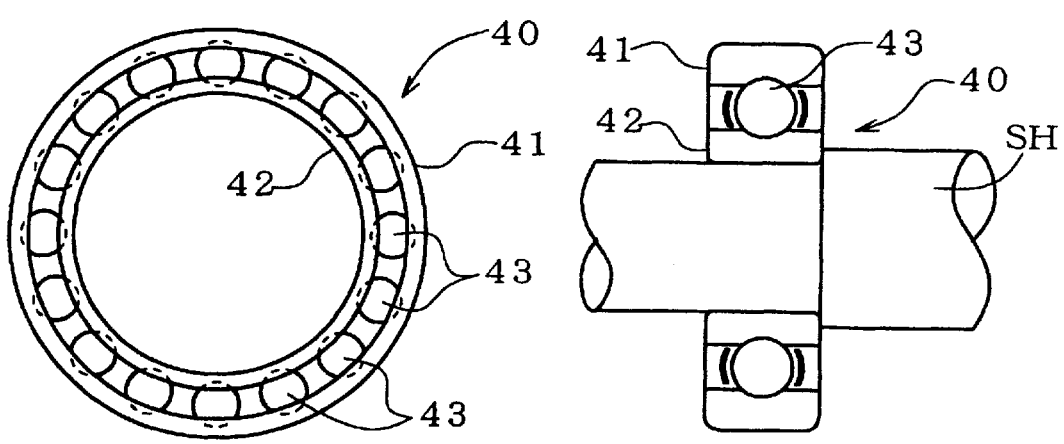
FIG. 10 is a schematic view showing a ball bearing using ceramic balls of the present invention.

As shown in FIG. 10, conductive ceramic bearing balls 43 obtained as described above are incorporated between an inner ring 42 and an outer ring 41, which are made of a ferrous metal; for example, bearing steel, thereby yielding a radial ball bearing 40. When a shaft SH is fixedly attached to the internal surface of the inner ring 42 of the ball bearing 40, the conductive ceramic bearing balls 43 are supported rotatably or slidably with respect to the outer ring 41 or the inner ring 42. Composite ceramic of which the conductive ceramic bearing ball 43 is made contains the titanium nitride phase in an amount of 30–70% by mass and the balance consisting predominantly of the silicon nitride phase and the grain boundary phase and exhibits an average coefficient of linear expansion of $2 \times 10^{-6}$/K to $5 \times 10^{-6}$/K within a temperature range of 20° C.–100° C. This value of the average coefficient of linear expansion is greater than that of silicon nitride ceramic which does not contain the titanium nitride phase, and is close to the coefficient of linear expansion of a ferrous material of which the outer ring 41 or the inner ring 42 is made. Accordingly, even when the ball bearing 40 is incorporated into a hard disk mechanism or a polygon scanner, which will be described later, and rotated at high speed, impairment in the rotational precision of the ball bearing 40 can be suppressed which would otherwise result from an increase in clearance between the balls 43 and the inner and outer rings 42 and 41 attributable to a temperature rise.

Composite ceramic of which the conductive ceramic bearing ball 43 is made exhibits an electrical resistivity of $10^6$ Ω·cm, indicating that the composite ceramic has relatively high conductivity. Thus, electrification (charging) is effectively prevented or suppressed. For example, in handling a large number of manufactured conductive ceramic bearing balls 43, the balls become unlikely to electrostatically adhere to, for example, a container, thereby maintaining smooth flow of working. Also, when the conductive ceramic bearing balls 43 are used in the form of the ball bearing 40, electrostatically induced adhesion of foreign matter, such as dust, to the balls 43 becomes unlikely to occur, thereby effectively suppressing generation of vibration and noise even during rotation at high speed.

Figure 11:
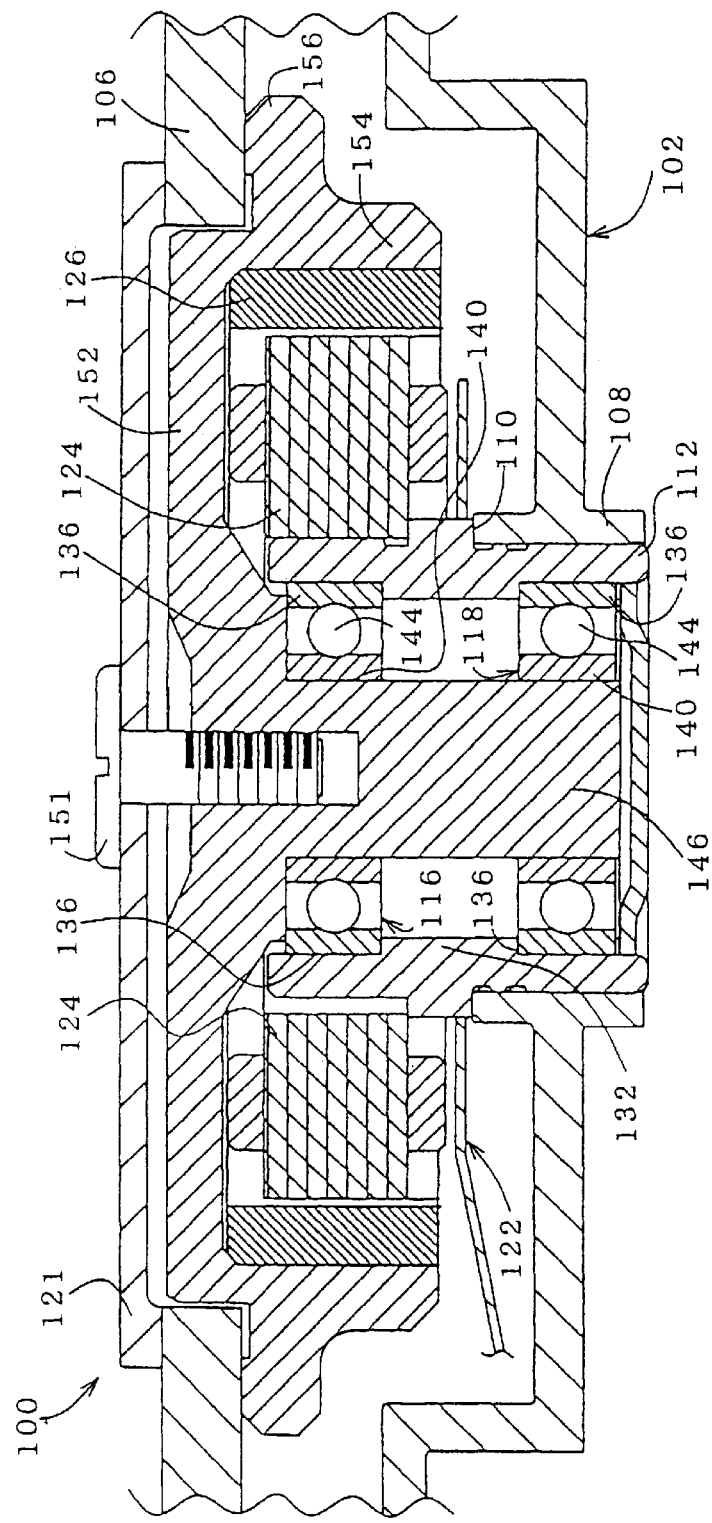
FIG. 11 is a longitudinal sectional view showing an example of a hard disk drive mechanism for computer use using the ball bearing of FIG. 10.

FIG. 11 is a longitudinal sectional view showing an example of configuration of a hard disk drive mechanism using the above-mentioned ball bearing. The hard disk drive mechanism 100 includes a body casing 102; a cylindrical shaft holder portion 108 formed at the center of the bottom of the body casing 102 in a vertically standing condition; and a cylindrical bearing holder bush 112 coaxially fitted to the shaft holder portion 108. The bearing holder bush 112 has a bush fixation flange 110 formed on the outer circumferential surface thereof and is axially positioned while the bush fixation flange 110 abuts one end of the shaft holder portion 108. Ball bearings 116 and 118 configured as shown in FIG. 10 are coaxially fitted into the bearing holder bush 112 at the corresponding opposite end portions of the bush 112 while abutting the corresponding opposite ends of a bearing fixation flange 132 projecting inward from the inner wall of the bearing holder bush 112. The ball bearings 116 and 118 are configured such that a plurality of conductive ceramic balls 144 of the present invention are disposed between an inner ring 140 and an outer ring 136.

A disk-rotating shaft 146 is fixedly fitted into the inner rings 140 of the ball bearings 116 and 118 so as to be supported by the ball bearings 116 and 118 in a rotatable condition with respect to the bearing holder bush 112 and the body casing 102. A flat, cylindrical disk fixation member (rotational member) 152 is integrally formed at one end of the disk-rotating shaft 146. A wall portion 154 is formed along the outer circumferential edge of the disk fixation member in a downward extending condition. An exciter permanent-magnet 126 is attached to the inner circumferential surface of the wall portion 154. A field coil 124 fixedly attached to the outer circumferential surface of the bearing holder bush 112 is disposed within the exciter permanent-magnet 126 so as to face the exciter permanent-magnet 126. The field coil 124 and the exciter permanent-magnet 126 constitute a DC motor 122 for rotating the disk. A disk fixation flange 156 projects outward from the outer circumferential surface of the wall portion 154 of the disk fixation member 152. An inner circumferential edge portion of a recording hard disk 106 is fixedly held between the disk fixation flange 156 and a presser plate 121. A clamp bolt 151 is screwed into the disk-rotating shaft 146 while extending through the presser plate 121.

When the field coil 124 is energized, the motor 122 starts rotating to thereby generate a rotational drive force while the disk fixation member 152 serves as a rotor. As a result, the hard disk 106 fixedly held by the disk fixation member 152 is rotated at a high speed of, for example, 5400–15000 rpm about the axis of the disk-rotating shaft 146 supported by the bearings 116 and 118.

Figure 12:
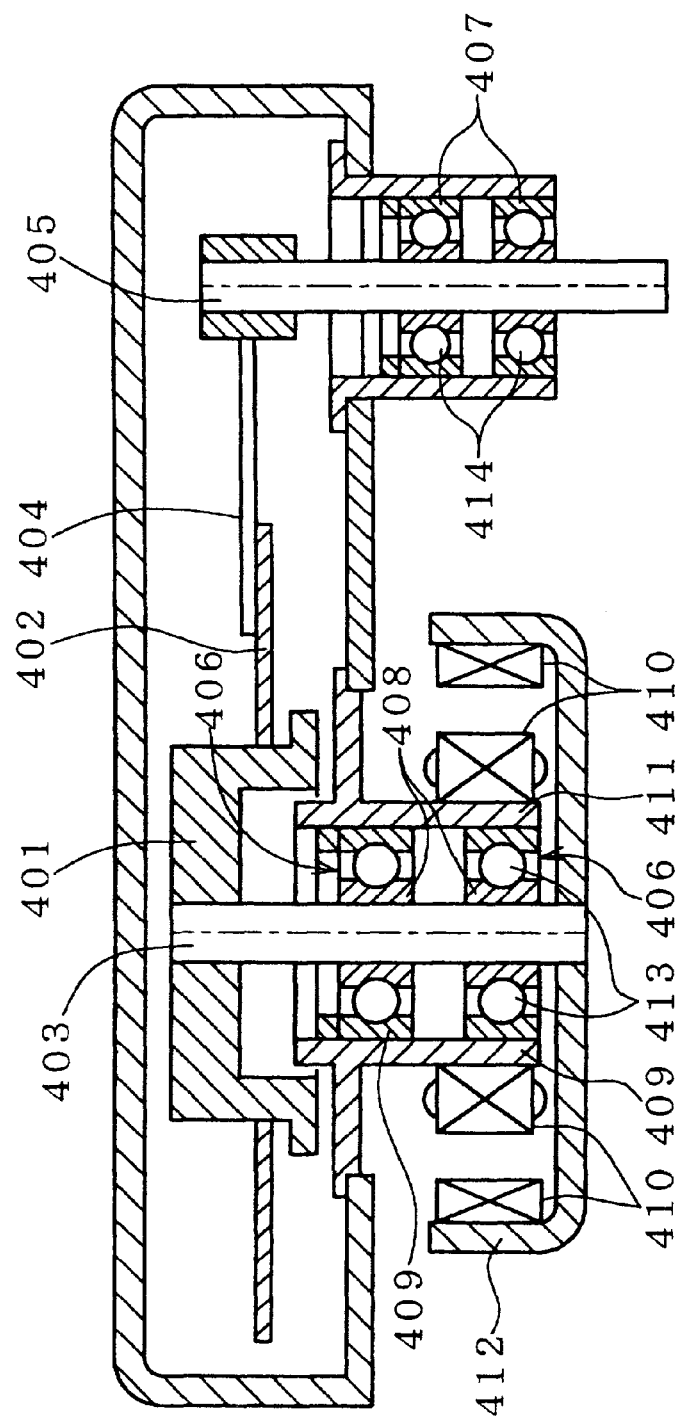
FIG. 12 is a sectional view showing an example of a hard disk drive for computer use equipped with a head drive mechanism.

FIG. 12 shows the structure of a hard disk drive (hereinafter abbreviated as "HDD") including a head arm drive unit. The structure has two rotational shafts; i.e., a rotational shaft 403 for rotationally supporting a magnetic disk 402 via a hub 401 and a rotational shaft 405 for a head arm 404 having a magnetic head (not shown) attached to its end. The rotational shaft 403 is supported by two ball bearings 406 of the present invention disposed axially apart from each other by a certain distance, whereas the rotational shaft 405 is supported by two ball bearings 407 of the present invention disposed axially apart from each other by a certain distance. The ball bearings 406 and 407 assume the same structure as that described previously. Inner rings 408 of the paired ball bearings 406 are fixedly attached to the rotational shaft 403 so as to rotate unitarily with the rotational shaft 403. Outer rings 409 of the paired ball bearings 406 are fixedly fitted into a cylindrical stator 411 of a spindle motor 410 (the spindle motor 410 and the bearings 406 constitute a motor having a bearing of the present invention, while the rotational shaft 403 serves as an output shaft of the motor). The rotational shaft 403 is located at the center of a dish-type rotor 412 and is rotated by means of the spindle motor 410.

The magnetic disk 402, which is rotatably supported as described above, rotates at high speed according to the rotational speed of the spindle motor 410. During rotation of the magnetic disk 402, the head arm 404, to which a magnetic head for reading/writing magnetic recording data is attached, operates as prescribed. The base end of the head arm 404 is supported by an upper portion of the rotational shaft 405. The rotational shaft 405 is rotated about its axis by means of an unillustrated actuator including a VCM such that the distal end of the head arm 404 is rotated by a required angle to thereby move the magnetic head to a required position. Thus, by rotational movement of the rotational shaft 405, required magnetic recording data can be read from or written to an effective recording region of the magnetic disk 402.

Figure 13:
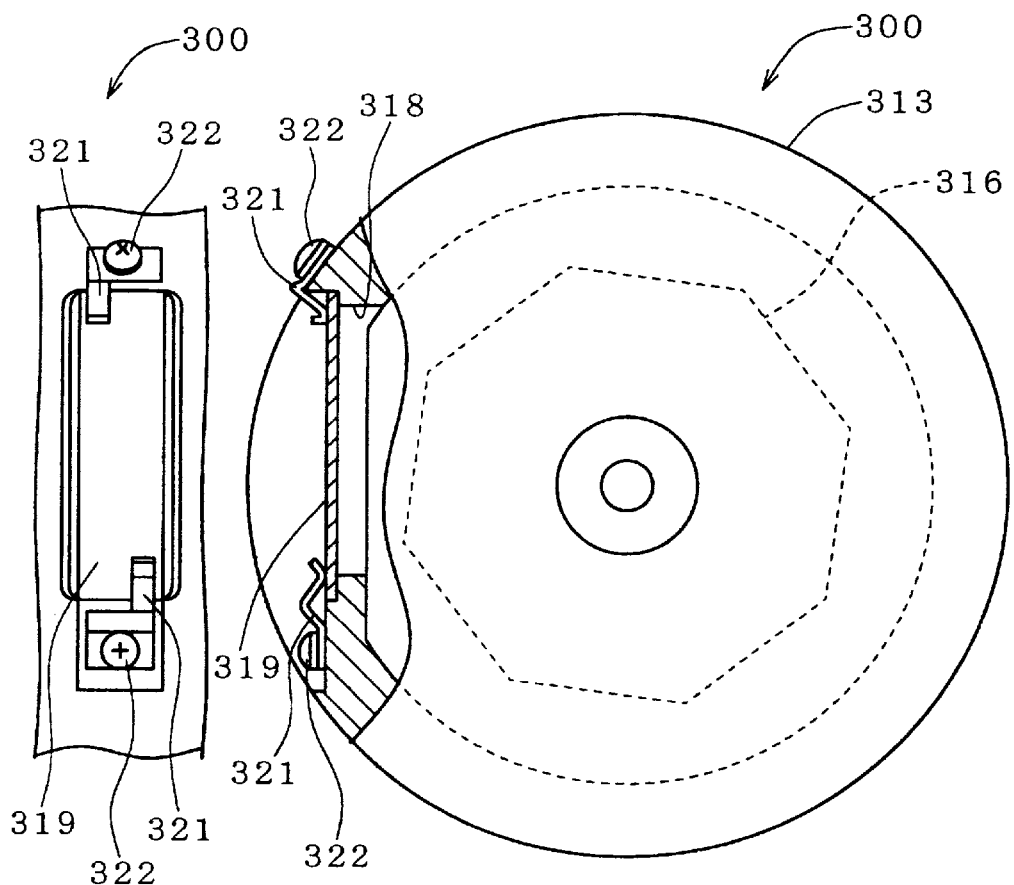
FIGS. 13(a)–13(c) are sectional views showing an example of a polygon scanner using the ball bearing of FIG. 10.
Figure 13:
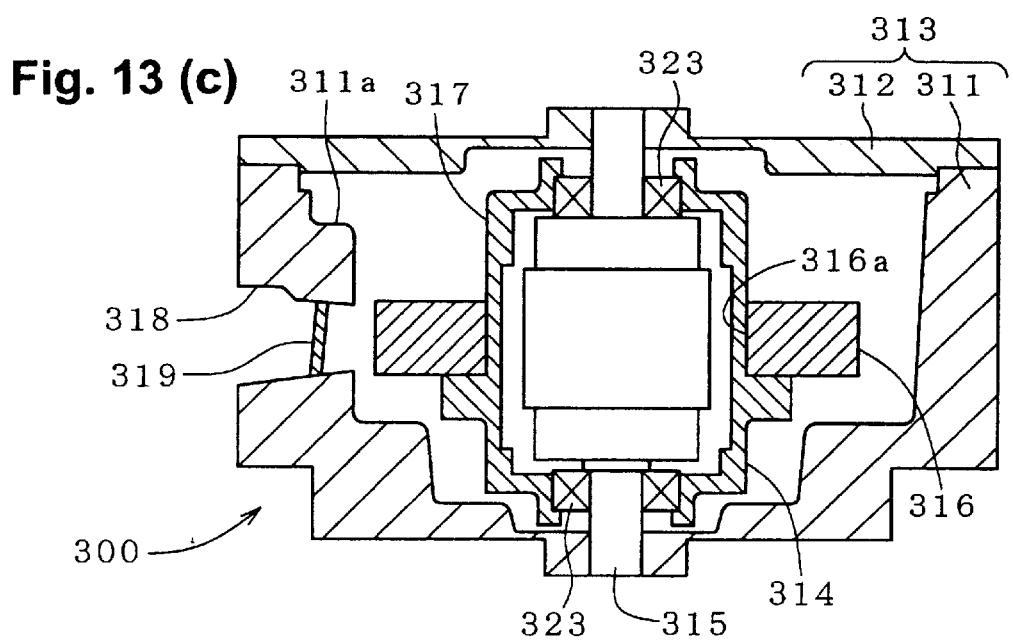

FIG. 13 shows an embodiment of a polygon scanner using the above-described ball bearing (FIG. 13(*a*) is a front view, FIG. 13(*b*) is a plan view, and FIG. 13(*c*) is a longitudinal sectional view). A polygon scanner 300 is used to generate a scanning light beam in image processing, such as photographing and copying, as well as in a laser printer. A motor 314 (herein, an outer rotor type), which is the motor having a bearing of the present invention, is accommodated within a substantially cylindrical enclosed case 313 composed of a body 311 and a cover 312 for covering the body 311. Opposite ends of a stationary shaft 315 are fixedly attached to the body 311 and the cover 312, respectively. A polygon mirror 316 includes a polygonal platelike member and reflectors formed on corresponding side walls of the polygonal platelike member. In the present embodiment, the polygon mirror 316 assumes the shape of a regular octagon. A rotor 317 of the motor 314 is fixedly inserted into a mounting hole 316a formed at a central portion of the polygon mirror 316, whereby the rotor 317 and the polygon mirror 316 can rotate unitarily. The rotor 317 is rotatably supported by the stationary shaft 315 via two ball bearings 323 of the present invention. The ball bearings 323 assume a structure similar to that shown in FIG. 10. The motor 314 rotates at high speed; for example, at a maximal rotational speed of not lower than 10000 rpm or 30000 rpm.

A window 318 for allowing an incoming/outgoing light beam to pass through is formed on the side wall of the body 311 in opposition to the polygon mirror 316. A window glass 319 is attached to the window 318. The window glass 319 is fitted to the window 318 from outside and is then pressed in place by means of a pair of flat springs 321. In FIG. 13, reference numeral 322 denotes a mounting screw for fixing the other end of the flat spring 321 on the body 311. A protrusion 311a is formed on the inner wall of the body 311 so as to provide a seat for the window glass 319.

When the motor 314 is operated, the polygon mirror 316 rotates about the axis of the stationary shaft 315. A light beam, such as a laser beam, entering through the window 318 impinges on the rotating polygon mirror 316 along a predetermined direction. Reflectors on the side walls of the rotating polygon mirror 316 sequentially reflect the incident light beam. The thus-reflected light beams are emitted through the window 318 and serve as scanning light beams.

Figure 14:
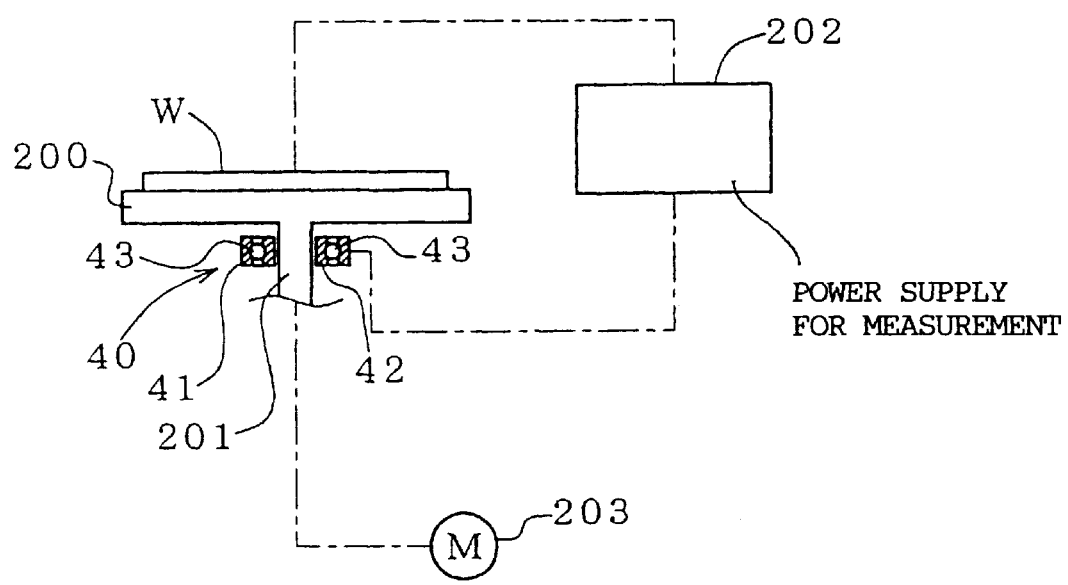
FIG. 14 is a schematic view showing an example of an electrical measuring apparatus using the ball bearing of FIG. 10.

FIG. 14 shows an apparatus for measuring flatness of a semiconductor wafer (e.g., a silicon wafer). The apparatus measures flatness in the following manner. While a rotary measuring table 200 on which a wafer W is placed is rotated, electricity is applied between the wafer W and the rotary measuring table 200 to thereby measure capacitance. On the basis of the measured capacitance, the flatness of the wafer W is evaluated. The rotary measuring table 200 is rotated by a motor 203 via a shaft 201 and is radially supported by the ball bearing 40. A power supply 202 supplies electricity to the rotary measuring table 200 along the bearing 40 and the shaft 201, which serve as an electrically conductive path.

EXAMPLE

In order to illustrate the effects of the present invention, the following experiment was carried out.

A silicon nitride powder and a titanium nitride powder specified below were prepared as starting materials:

1) Mixture (hereinafter called sintering-aid-containing silicon nitride powder) of silicon nitride powder (50% grain size 0.5 μm, BET specific area 12 m²/g) 100 parts by weight, magnesium carbonate powder (50% grain size 0.6 μm) 1 part by weight, aluminum oxide powder (50% grain size 0.2 μm) 1 part by weight, zirconium oxide powder (50% grain size 2 μm) 2 parts by weight, and cerium oxide powder (50% grain size 1.5 μm) 2 parts by weight; and 2) Titanium nitride powder (50% grain size 1.1 μm, oxygen content 2.0% by mass, iron content 0.05% by mass).

The 50% grain size of powder was measured using a laser diffraction granulometer (model LA-500, product of Horiba, Ltd.). The BET specific surface area was measured using a BET-specific-area measuring device (MULTISORB 12, product of Yuasa Ionics, Corp.).

Figure 5:
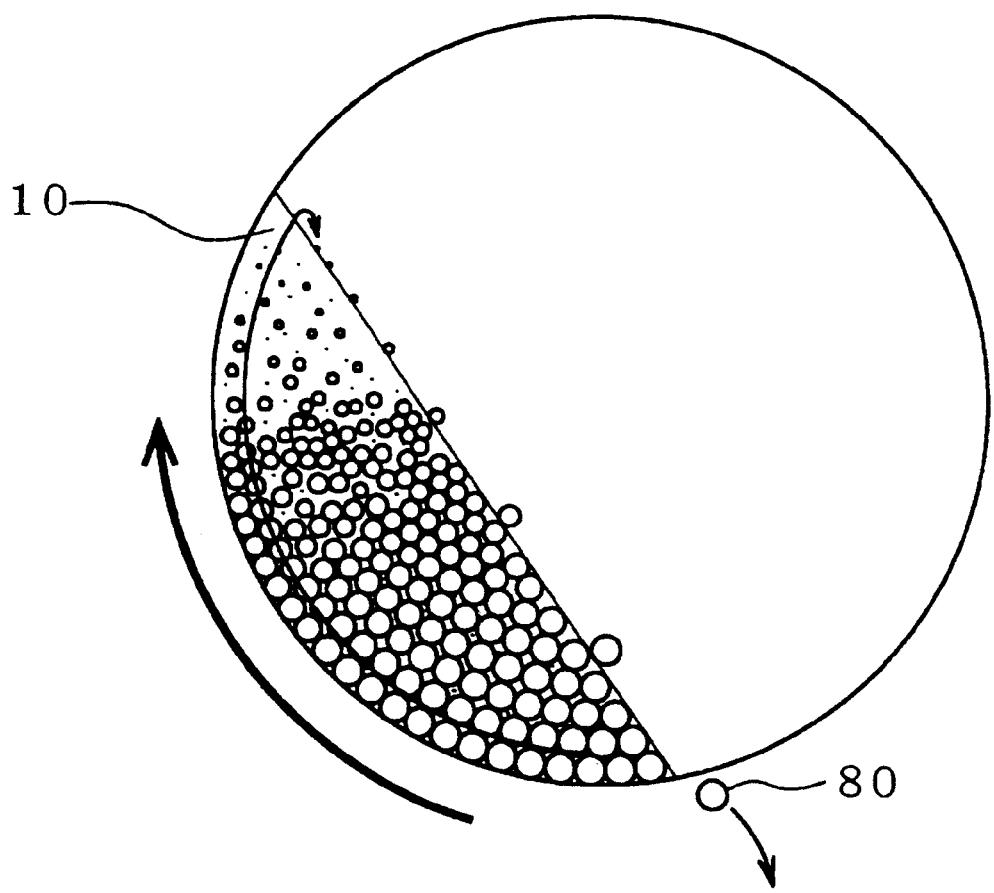
FIG. 5 is a view showing an action subsequent to that of FIG. 2.

The silicon nitride powder and the titanium nitride powder described above were mixed according to the mixing proportions shown in Table 1. To each of the powder mixtures (100 parts by weight), pure water (50 parts by weight) serving as a solvent and an organic binder (an appropriate amount) were added. The resulting mixture was mixed for 10 hours by means of an attriter mill, to thereby obtain a slurry of the forming material powder. The thus-obtained slurries were formed into various forming material powders using the apparatus shown in FIG. 5. The forming material powders were each subjected to rolling granulation, to thereby yield spherical green bodies having a diameter of approximately 2.5 mm. The thus obtained spherical green bodies were fired at a temperature of 1700° C. for 3 hours in an $N_2$ atmosphere having a pressure of 100 atm.

The sintered balls were precision-polished to a sphericity of 0.08 μm and an arithmetic average surface roughness of 0.012 μm, to thereby yield conductive ceramic bearing balls having a diameter of 2 mm. Also, plate-like test pieces, each measuring 4 mm×8 mm×20 mm, were manufactured and measured for electrical specific resistance (corresponding to electrical resistivity) by a DC 4-terminal method along the longitudinal direction. The test pieces were heated from 20° C. to 200° C. by means of a heater and measured for a dimensional change along the longitudinal direction using a laser interferometer. On the basis of measurement data, the average coefficient of linear expansion within a temperature range of 20° C.–100° C. and that within a temperature range of 20° C.–200° C. were obtained for the individual test pieces.

Bearings as shown in FIG. 10 were each manufactured by incorporating the polished bearing balls between an outer ring and an inner ring, which were made of high-carbon chromium bearing steel (JIS G 4805 (1990): SUJ). A microphone (a pickup sensor) was attached to the outer ring. While the outer ring was fixed, the inner ring was rotated at 10000 rpm to determine whether excess noise was generated. The evaluation was made according to the following criteria: in excess of 30 dB in sensor output: excess noise present (x); 30–25 dB: minor excess noise present (Δ); and less than 25 dB: normal (○). Also, an evaluation was made according to the following criteria: the appearance of the ceramic ball exhibits an anomaly after testing: not acceptable (x); the appearance of the ceramic ball exhibits no more than a very minor anomaly after testing: acceptable (Δ); and the appearance of the ceramic ball exhibits no anomaly after testing: good (○). Herein, the appearance means whether or not a flake has peeled off from the ball surface. The double circles indicate the best range. The test results are shown in Table 1.

TABLE 1

| Sample No. | 1 | 2 | 3 | 4 | 5 | 6 | 7 | 8 |
|---|---|---|---|---|---|---|---|---|
| Titanium nitride powder content (% by mass) | 0 | 10 | 30 | 40 | 50 | 60 | 70 | 80 |
| Sintering-aid-containing silicon nitride powder content (% by mass) | 100 | 90 | 70 | 60 | 50 | 40 | 30 | 20 |

TABLE 1-continued

| Sample No. | 1 | 2 | 3 | 4 | 5 | 6 | 7 | 8 |
|---|---|---|---|---|---|---|---|---|
| Coefficient of linear expansion (20° C.–100° C.: × $10^{-6}$/K) | 1.4 | 2.0 | 3.1 | 3.4 | 4.0 | 4.5 | 5.0 | 5.5 |
| Coefficient of linear expansion (20° C.–200° C.: × $10^{-6}$/K) | 1.7 | 2.4 | 3.7 | 4.3 | 4.9 | 5.5 | 6.0 | 6.6 |
| Surface electrical-resistivity (Ω · cm) | ∞ | 1 × $10^6$ | 0.1 | ≦0.1 | ≦0.1 | ≦0.1 | ≦0.1 | ≦0.1 |
| Noise | Δ | ○ | ○ | ◎ | ◎ | ◎ | ◎ | X |
| Appearance | ○ | ◎ | ◎ | ◎ | ◎ | ◎ | ○ | X |

The above test results show that the bearings using the ceramic balls which satisfy the numerical requirements of the present invention exhibit good results in terms of noise and appearance after testing.

It should further be apparent to those skilled in the art that various changes in form and detail of the invention as shown and described above may be made. It is intended that such changes be included within the spirit and scope of the claims appended hereto.

This application is based on Japanese Patent Application No. 2000-263391 filed Aug. 31, 2000, the disclosure of which is incorporated herein by reference in its entirety.

What is claimed is:

1. A conductive ceramic bearing ball comprising a mixed microstructure of a silicon nitride phase and a titanium nitride phase and having a content ratio of said silicon nitride phase to said titanium nitride phase such that the conductive ceramic bearing ball has an average coefficient of linear expansion within a temperature range of 20° C.–100° C. of from $2\times10^{-6}$/K to $5\times10^{-6}$/K.

2. The conductive ceramic bearing ball as claimed in claim 1, wherein the conductive ceramic bearing ball contains said titanium nitride phase in an amount of 10–70% by mass and contains said silicon nitride phase and a grain boundary phase in a total amount of 30–90% by mass.

3. The conductive ceramic bearing ball as claimed in claim 2, wherein the conductive ceramic bearing ball contains said silicon nitride phase in an amount of 20–87% by mass and contains said grain boundary phase in an amount of 3–10% by mass.

4. The conductive ceramic bearing ball as claimed in claim, 1, having a sphericity of not greater than 0.08 μm and a ball diameter variation of less than 0.10 μm.

5. The conductive ceramic bearing ball as claimed in claim 1, having a surface electrical-resistivity of not greater than $10^6$ Ω·cm.

6. A ball bearing having a plurality of conductive ceramic bearing balls as claimed in claim 1 incorporated as rolling elements between an inner ring and an outer ring made of a ferrous metal containing a predominant amount of iron.

7. The ball bearing as claimed in claim 6, for use in a hard disk drive as a bearing member for a shaft for rotating a hard disk or as a bearing member for a rotary shaft for driving a head arm.

8. A motor having a bearing member, said bearing member comprising a ball bearing as claimed in claim 6.

9. A motor having a ball bearing as claimed in claim 8, for use in a drive unit of a hard disk drive for rotating a hard disk.

10. A motor having a ball bearing as claimed in claim 8, for use in a drive unit of a polygon scanner for driving a polygon mirror.

11. A motor having a ball bearing as claimed in claim 8, wherein said motor rotates at a maximum speed of not less than 8000 rpm.

12. A hard disk drive comprising a motor having a ball bearing as claimed in claim 9, and a hard disk, said motor rotating said hard disk.

13. A polygon scanner comprising a motor having a ball bearing as claimed in claim 10 and a polygon mirror, said motor rotating said polygon mirror.

14. The conductive ceramic bearing ball as claimed in claim 1, having a Fe content of not greater than 0.3% by mass.

15. The conductive ceramic bearing ball as claimed in claim 1, having a Fe content of not greater than 0.1% by mass.

* * * * *